(12) United States Patent
Krause et al.

(10) Patent No.: US 12,331,827 B2
(45) Date of Patent: Jun. 17, 2025

(54) OIL DISTRIBUTOR, AXLE DRIVE AND MOTOR VEHICLE

(71) Applicant: Vitesco Technologies Germany GMBH, Regensburg (DE)

(72) Inventors: Robert Krause, Berlin (DE); Philipp Kolbe, Berlin (DE)

(73) Assignee: Vitesco Technologies Germany GmbH, Regensburg (DE)

( * ) Notice: Subject to any disclaimer, the term of this patent is extended or adjusted under 35 U.S.C. 154(b) by 0 days.

(21) Appl. No.: 18/531,123

(22) Filed: Dec. 6, 2023

(65) Prior Publication Data

US 2024/0110622 A1 Apr. 4, 2024

Related U.S. Application Data

(63) Continuation of application No. PCT/EP2022/058119, filed on Mar. 28, 2022.

(30) Foreign Application Priority Data

Jun. 25, 2021 (DE) .................. 10 2021 206 607.0

(51) Int. Cl.
    *F16H 57/04* (2010.01)
(52) U.S. Cl.
    CPC ..... *F16H 57/0423* (2013.01); *F16H 57/0483* (2013.01)
(58) Field of Classification Search
    CPC ............. F16H 57/0423; F16H 57/0457; F16H 57/0493
    See application file for complete search history.

(56) References Cited

U.S. PATENT DOCUMENTS

| | | | | |
|---|---|---|---|---|
| 1,220,810 A | * | 3/1917 | Alquist | ............... F16H 57/0447 184/6.12 |
| 3,529,698 A | * | 9/1970 | Nelson | ............... F16H 57/0447 184/6.12 |

(Continued)

FOREIGN PATENT DOCUMENTS

| | | |
|---|---|---|
| DE | 102007021686 A1 | 11/2008 |
| DE | 102018213990 B3 | 9/2019 |

(Continued)

OTHER PUBLICATIONS

European Search Report dated Jun. 23, 2022 for corresponding European Patent Application No. PCT/EP2022/058119.

(Continued)

*Primary Examiner* — Michael A Riegelman

(57) ABSTRACT

An oil distributor for an axle drive of a motor vehicle, having a first trough element with a first wall, a second trough element which is placed onto the first trough element and has a second wall, wherein the first trough element and/or the second trough element has an oil capture opening; wherein in an assembled state, the first trough element is fluidically connected to the second trough element, and the first trough element and the second trough element form a U-shaped outer contour at least in portions such that the first trough element and the second trough element may surround portions of a gear wheel of a gear mechanism; and an oil outlet opening formed in the first trough element and/or the second trough element, via which an oil may emerge from the oil distributor.

14 Claims, 5 Drawing Sheets

(56) References Cited

U.S. PATENT DOCUMENTS

| | | | | |
|---|---|---|---|---|
| 3,625,310 A * | 12/1971 | Herrick | F16N 19/003 | 184/6.12 |
| 4,270,497 A * | 6/1981 | Valerio | F01M 11/0004 | 184/106 |
| 4,470,324 A * | 9/1984 | Renk | F16H 57/0423 | 74/606 R |
| 4,519,348 A * | 5/1985 | Hamilton | F01M 11/0004 | 123/196 R |
| 4,630,711 A * | 12/1986 | Levrai | F16N 7/28 | 184/6.12 |
| 4,721,184 A * | 1/1988 | Sowards | F16N 29/04 | 184/6.12 |
| 4,842,100 A * | 6/1989 | Cameron | F16C 33/6659 | 184/6.12 |
| 4,938,184 A * | 7/1990 | Martin | F01M 11/0004 | 184/106 |
| 4,986,235 A * | 1/1991 | Ishii | F01M 11/0004 | 123/196 R |
| 5,038,631 A * | 8/1991 | Renk | B61C 17/08 | 277/412 |
| 5,768,954 A * | 6/1998 | Grabherr | F16H 57/0447 | 74/606 R |
| 6,223,616 B1 * | 5/2001 | Sheridan | F16H 1/2827 | 184/6.12 |
| 6,299,561 B1 * | 10/2001 | Kramer | F16H 57/0447 | 184/6.12 |
| 6,616,432 B2 * | 9/2003 | Szczepanski | F04C 2/082 | 184/6.12 |
| 6,647,578 B2 * | 11/2003 | Morgan | A47L 5/30 | 15/49.1 |
| 6,729,292 B1 * | 5/2004 | Bock | F01M 11/08 | 184/106 |
| 7,213,682 B2 * | 5/2007 | Gibson | F16H 57/0421 | 184/6.12 |
| 7,421,921 B2 * | 9/2008 | Kimura | F16H 57/043 | 184/6.12 |
| 7,686,137 B2 * | 3/2010 | Tominaga | F16H 57/0408 | 184/6.12 |
| 7,883,439 B2 * | 2/2011 | Sheridan | F02C 7/36 | 475/159 |
| 8,393,248 B2 * | 3/2013 | Nagahama | F16H 57/0006 | 184/6.12 |
| 8,534,425 B2 * | 9/2013 | Jabs | F16H 57/0447 | 184/11.1 |
| 8,672,094 B2 * | 3/2014 | Quehenberger | F16H 57/0457 | 184/6.12 |
| 8,707,826 B2 * | 4/2014 | Jacobs | F16H 57/0447 | 74/606 R |
| 8,746,405 B2 * | 6/2014 | Perakes | F16H 57/0409 | 184/6.12 |
| 8,899,381 B2 * | 12/2014 | Ebihara | F16H 57/0423 | 184/6.12 |
| 9,038,779 B2 * | 5/2015 | McCune | F16H 57/0423 | 184/6.11 |
| 9,551,247 B2 * | 1/2017 | Michel | F16H 57/0443 | |
| 9,772,026 B2 * | 9/2017 | Fast | F16H 57/0423 | |
| 9,772,027 B2 * | 9/2017 | Preston | F16H 57/0409 | |
| 9,810,311 B1 * | 11/2017 | Zhang | F16H 57/0483 | |
| 9,856,971 B2 * | 1/2018 | Mikami | F16H 57/045 | |
| 11,365,798 B1 * | 6/2022 | Rejman | F16H 57/02 | |
| 2005/0103570 A1 | 5/2005 | Gibson | F16H 57/0421 | 184/6.12 |
| 2007/0251348 A1 * | 11/2007 | Hayes | F16H 57/0434 | 74/606 R |
| 2008/0190497 A1 * | 8/2008 | Varda | F15B 1/26 | 137/574 |
| 2009/0090096 A1 * | 4/2009 | Sheridan | F02C 7/36 | 60/226.3 |
| 2009/0165587 A1 * | 7/2009 | Ariga | F16H 57/0423 | 475/160 |
| 2009/0314580 A1 * | 12/2009 | Jabs | F16H 57/0447 | 184/11.1 |
| 2010/0180721 A1 * | 7/2010 | Quehenberger | F16H 57/0447 | 74/606 R |
| 2011/0041649 A1 * | 2/2011 | Iwata | F16H 57/0447 | 74/606 R |
| 2012/0073403 A1 * | 3/2012 | Perakes | F16H 57/0409 | 74/607 |
| 2013/0102432 A1 * | 4/2013 | Imai | F16H 57/045 | 475/159 |
| 2017/0030457 A1 * | 2/2017 | Hotait | F16H 57/0463 | |
| 2017/0102064 A1 * | 4/2017 | Preston | F16H 57/0483 | |
| 2018/0149260 A1 * | 5/2018 | Singh | F16H 57/0423 | |
| 2024/0110622 A1 * | 4/2024 | Krause | F16H 57/0493 | |

FOREIGN PATENT DOCUMENTS

| | | |
|---|---|---|
| EP | 3018386 A1 | 5/2016 |
| FR | 3066573 A3 | 11/2018 |
| GB | 1115446 A | 5/1968 |
| JP | 2003329112 A | 11/2003 |
| JP | 2021038821 A | 3/2021 |

OTHER PUBLICATIONS

German Search Report dated Mar. 3, 2022 for corresponding German Patent Application No. 10 2021 206 607.0.

* cited by examiner

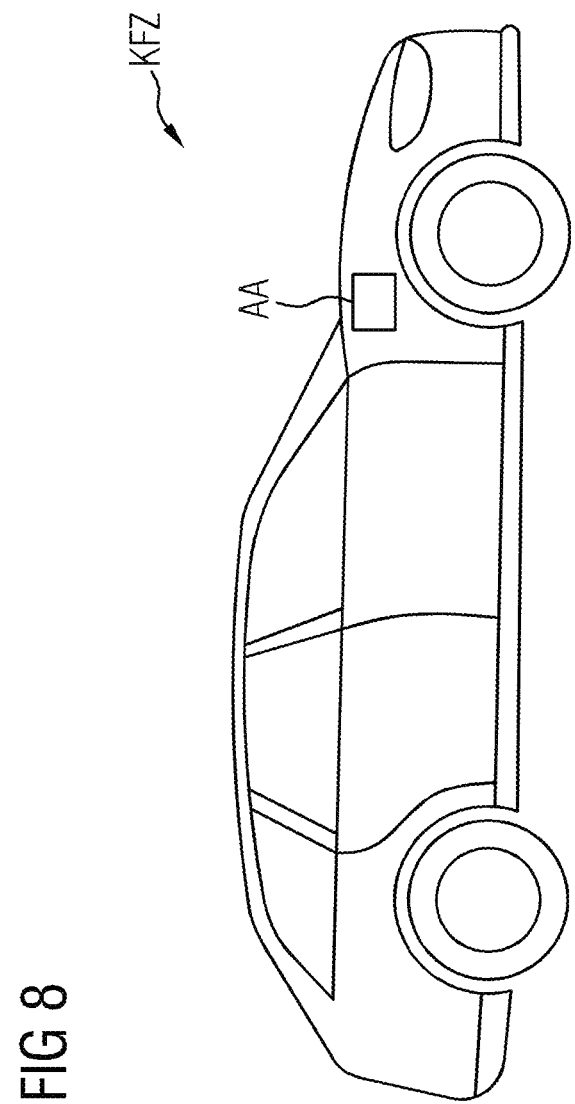

OIL DISTRIBUTOR, AXLE DRIVE AND MOTOR VEHICLE

CROSS-REFERENCE TO RELATED APPLICATIONS

This application claims priority to PCT Application PCT/EP2022/058119, filed Mar. 28, 2022, which claims priority to German Patent Application No. DE 10 2021 206 607.0, filed Jun. 25, 2021. The disclosures of the above applications are incorporated herein by reference.

FIELD OF THE INVENTION

The invention concerns an oil distributor for an axle drive of a motor vehicle, wherein the oil distributor has a first trough element and a second trough element which is fluidically coupled to the first trough element, wherein an outer contour of the oil distributor is U-shaped at least in portions in order to surround portions of a gear wheel of a gear mechanism. The invention also concerns an axle drive for a motor vehicle with the oil distributor according to the invention. The invention furthermore concerns a motor vehicle with the axle drive according to the invention.

BACKGROUND OF THE INVENTION

Axle drives for motor vehicles are known in principle. The known axle drives generally have a gear mechanism as well as an inverter and an electric machine. The gear mechanism may for example also be described as a reducer. In gear mechanisms, usually multiple metallic gear wheels intermesh. In order to reduce friction between the teeth of the gear wheels, at least some gear wheels run in an oil bath. During a rotation of the gear wheel, the oil is at least partially collected from the oil bath and then at least partially sprayed out, directly or indirectly.

U.S. Pat. No. 3,529,698 A discloses that the oil collected and sprayed out by a gear wheel is captured via a one-piece oil distributor and can be returned to the gear wheels in targeted fashion via an oil outlet.

A similar lubrication device is described in DE 10 2007 021 686 A1, arranged at a distance from the circumferential direction of a gear wheel.

SUMMARY OF THE INVENTION

It is an object of the present invention to indicate an oil distributor for an axle drive of a motor vehicle which may easily be arranged in a gear mechanism, may collect as much oil sprayed out by a gear wheel as possible, and easily return the captured oil to the points to be lubricated.

The object is achieved by the subject matter described herein. Refinements and/or embodiments of the invention are the subject of the description which follows and the drawings. In this case, each feature may represent an aspect of the invention both individually and in combination, provided nothing to the contrary is explicitly stated in the description.

According to the invention, an oil distributor for an axle drive of a motor vehicle is described, including a first trough element with a first wall, a second trough element which is placed onto the first trough element and has a second wall, wherein the first trough element and/or the second trough element has an oil capture opening; wherein in an assembled state, the first trough element is fluidically connected to the second trough element, and the first trough element and the second trough element form a U-shaped outer contour at least in portions, such that the first trough element and the second trough element may surround portions of a gear wheel of a gear mechanism; and an oil outlet opening formed in the first trough element and/or the second trough element, via which an oil may emerge from the oil distributor.

In other words, one aspect of the present invention is that an oil distributor is provided for an axle drive of a motor vehicle. The motor vehicle is an at least partially electrically driven motor vehicle. The axle drive is configured and/or designed to drive the motor vehicle electrically. Inside the axle drive, a gear mechanism is formed in which the oil distributor may be or is arranged.

The oil distributor has a first trough element and a second trough element which is placed on the first trough element. This means that the first trough element and the second trough element may be connected together. Via this connection, the first trough element and the second trough element are fluidically coupled or connected together. The first trough element and/or the second trough element has an oil capture opening. It may thus be provided that only the first trough element or the second trough element has an oil capture opening. However, both the first trough element and the second trough element each have an oil capture opening in order to enlarge the opening area. Thus as much oil as possible is captured. Because of the fluidic coupling of the first trough element to the second trough element, for example oil captured in the first trough element may flow into the second trough element. It is also conceivable that oil captured by the second trough element may flow into the first trough element.

Because of the connection and/or coupling of the first trough element to the second trough element, the oil distributor has a U-shaped outer contour at least in regions, so that the oil distributor may surround a gear wheel on its two end faces and on a circumferential portion connecting the two end faces. The multipiece design means that the oil distributor is easily arranged in a gear mechanism. In a first step, the first trough element is arranged in a first casing half. Then the gear wheel is arranged such that at least a first end face of the gear wheel is arranged parallel to the first trough element. Then the second trough element is placed on the first trough element, wherein the second trough element at least in portions runs parallel to the second end face of the gear wheel, and a part portion of the first trough element and/or a part portion of the second trough element also runs parallel to a circumferential portion of the gear wheel connecting the first end face and the second end face. Because of the at least partially U-shaped outer contour of the oil distributor, as much oil as possible which has been ejected and/or sprayed out by the gear wheel is collected by the oil distributor via the oil capture opening.

At least one oil outlet opening is formed in the first trough element and/or the second trough element, via which opening the oil collected by the oil distributor may emerge and be conducted accordingly in targeted fashion to parts of the gear mechanism to be lubricated.

In a refinement of the invention, it is provided that the first trough element has a first wall and the second trough element has a second wall; on a side facing the second trough element, the first wall has a first inner wall portion, and on a side facing the first trough element, the second wall has a second inner wall portion, wherein a fluidic connection opening is formed both in the first inner wall portion and in the second inner wall portion. The fluidic connection opening is accordingly a peripherally closed passage opening in the first inner wall portion or second inner wall portion. In an embodiment, the first inner wall portion and the second inner wall portion run parallel to one another at least in portions. It is conceivable that the first inner wall portion lies on the second inner wall portion and hence they have direct contact with one another. The first trough element is in any case arranged and connected to the second trough element such that oil arranged in the first trough element may flow from the first trough element into the second trough element via the fluidic connection opening of the first trough element and the fluidic connection opening of the second trough element. Similarly, oil arranged in the second trough element may flow into the first trough element in this fashion.

A refinement of the invention proposes that the fluidic connection opening of the first trough element has a protrusion on an outside of the first inner wall portion, or the fluidic connection opening of the second trough element has a protrusion on an outside of the first inner wall portion, which protrusion engages in the fluidic connection opening of the respective other trough element. In this way, a type of duct and/or bridge is formed by the protrusion, so that the first inner wall portion and the second inner wall portion may have a small spacing from one another which is bridged by the protrusion. The protrusion is fluid-conductive. Thus for example, oil may flow from the first trough element into the second trough element via the fluidic connection opening of the first inner wall portion and the protrusion which extends into the fluidic connection opening of the second inner wall portion.

In this context, a refinement of the invention provides that the protrusion is configured as a circumferential collar. The protrusion may therefore also be referred to as a duct. Because of the circumferential design of the collar, this is annular and may have a circular, oval, elliptical or polygonal outer contour. The collar is configured correspondingly to the fluidic connection opening into which the protrusion extends. In other words, the outer dimensions of the protrusion are smaller than a cross-section, a diameter and/or a width of the fluidic connection opening into which the protrusion engages or extends.

In a refinement of the invention, the first trough element has an outer wall portion spaced apart from the first inner wall portion, a fastening receiver is formed in the outer wall portion for stationary fastening of the first trough element, and a material cutout is formed in the first inner wall portion aligned with the fastening receiver. The material cutout in the inner wall portion thus allows introduction of a fastener, such as a screw, into the fastening receiver. Also, a tool for actuating the fastener may be conducted through the material cutout. The material cutout may thus also be designated or regarded as a mounting cutout. Thus the first trough element is fastened in a simple and/or compact fashion. The compact fastening is achieved because the fastening receiver in the outer wall portion is formed at the level of the first inner wall portion.

In this context, an embodiment of the invention provides that on the outside of the second inner wall portion, a material protrusion is formed which in assembled state engages in the material cutout. Thus the material cutout of the first inner wall portion may be closed, without an additional separate part, by the second trough portion or the material protrusion formed on the outside of the second inner wall portion, in order to prevent and/or reduce an escape of oil via the material cutout.

In principle, it is conceivable that the first trough element and/or the second trough element is made of metal. A refinement of the invention provides that the first trough element and/or the second trough element is made of plastic and/or at least partially includes plastic. The plastic is in an embodiment a duroplastic material. In an embodiment, the plastic may be fiber-reinforced. The fiber reinforcement may be a glass-fiber reinforcement and/or a carbon-fiber reinforcement. By forming the first trough element and/or the second trough element from plastic, the weight of the oil distributor is reduced. Also, the first trough element and/or the second trough element may be produced cheaply by a plastic injection-moulding process. The stiffness of the first trough element and/or of the second trough element may be increased by the fiber reinforcement. This may have an effect on the vibration resistance of the oil distributor and/or on the weight of the oil distributor.

The oil outlet opening is arranged and/or configured such that oil is discharged from the first trough element to the second trough element via the oil outlet opening. According to a refinement of the invention, it is provided that the oil outlet opening is arranged and/or formed in the first wall, in the second wall and/or in a trough base of the first trough element or in a trough base of the second trough element. The closer the oil outlet opening is to the trough base, the sooner the oil is discharged via the oil outlet opening, even when the oil level inside the first trough element and/or the second trough element is low.

In an embodiment of the invention, it is provided that the first trough element and/or the second trough element each has a plurality of outlet openings formed and/or configured spaced apart from one another. Thus different points and/or bearings inside the gear mechanism may be lubricated with oil via the oil distributor.

In a refinement of the invention, the oil outlet opening has an oil guide rail on a trough outside of the first trough element and/or the second trough element. The trough outside faces away from a trough inside for receiving the oil. Via the oil guide rail, which may for example also be described as a drip lug, oil is supplied to specific points, such as bearings, inside the gear mechanism.

In this context, an embodiment of the invention provides that the oil guide rail has a U-shaped cross-section. A U-shaped oil guide rail is simple and cheap to produce, and allows guidance of the oil.

According to a second aspect, the invention concerns an axle drive of a motor vehicle including at least one output shaft of a gear mechanism, wherein a gear wheel is arranged rotationally fixedly on the output shaft; and the oil distributor according to the invention, wherein the oil distributor surrounds the gear wheel at least in portions.

Accordingly, it is provided that the gear wheel is arranged, directly or indirectly, rotationally fixedly on the output shaft of the gear mechanism. The gear wheel has a first end face and a second end face arranged spaced apart from the first end face in the longitudinal direction of the gear wheel. The oil distributor is now arranged such that the first trough element is oriented running parallel to the first end face at least in portions. The second trough element runs parallel to the second end face at least in portions. A part portion of the first trough element and/or a part portion of the second trough element runs parallel to a circumferential portion of the gear wheel connecting the first end face and the second end face. Because of the at least partially U-shaped outer contour of the oil distributor, as much oil as possible which has been ejected and/or sprayed out by the gear wheel is collected by the oil distributor via the oil capture opening.

An refinement of the invention provides that the gear mechanism has a first casing half and a second casing half, wherein the first trough element is fastened in the first casing half and the second trough element is fastened in the second casing half. In this way, the first trough element and the second trough element may easily be mounted positionally securely. When the two casing halves are assembled, the first trough element and the second trough element are fluidically coupled together.

In an embodiment of the invention, it is provided that the gear mechanism has at least three different shafts spaced apart from one another, each shaft is mounted rotatably about its respective longitudinal axis by means of two bearings, and the oil outlet openings and/or the oil guide rails are arranged and/or oriented such that oil is supplied to each bearing via at least one oil outlet opening and/or oil guide rail. The three shafts may be the gearbox input shaft which is coupled to the an electrical machine, an output shaft connected to a differential, and an intermediate shaft arranged between the gearbox input shaft and the output shaft. The shafts are mounted rotatably about their respective longitudinal axis via corresponding bearings. All bearings may be supplied with oil by just one oil distributor via the correspondingly oriented oil outlet openings and/or oil guide rails, whereby the durability of the axle drive is increased. Also, the friction losses may be reduced by efficient lubrication inside the gear mechanism, which may have an effect on the range of the motor vehicle between two charging cycles.

In a third aspect, the invention relates to a motor vehicle with the axle drive according to the invention.

The motor vehicle is an at least partially, and in an embodiment fully, electrically driven motor vehicle.

It is pointed out that all features described above and below in reference to an aspect of the present invention apply equally to any other aspect of the present invention. In an embodiment, all features of the oil distributor may also be features of the axle drive and/or also features of the motor vehicle. This also applies conversely.

Further features and advantages of the present invention will emerge from the following exemplary embodiments. The exemplary embodiments are to be understood not as restrictive, but rather as examples. They are intended to enable a person skilled in the art to implement the invention. The applicant reserves the right to make one and/or more of the features disclosed in the exemplary embodiments.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The exemplary embodiments will be discussed in more detail with reference to drawings.
in which:
FIG. 8 shows a motor vehicle with the axle drive.

DETAILED DESCRIPTION OF THE PREFERRED EMBODIMENTS

The following description of the preferred embodiment(s) is merely exemplary in nature and is in no way intended to limit the invention, its application, or uses.

Figure 1:
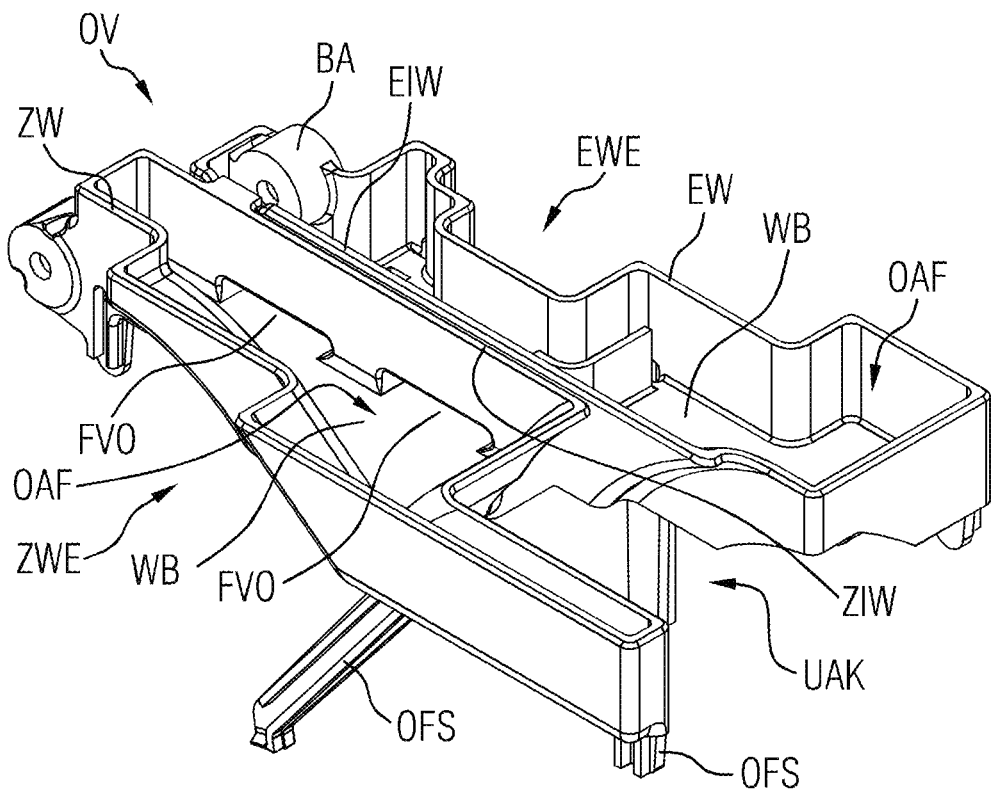
FIG. 1 shows a three-dimensional view of an oil distributor with a first trough element and a second trough element.

FIG. 1 shows a three-dimensional view of an oil distributor OV for an axle drive AA of a motor vehicle KFZ. The oil distributor OV is formed in two pieces and has a first trough element EWE and a second trough element ZWE placed on the first trough element EWE.

The first trough element EWE includes a trough base WB and a first wall EW connected to the trough base WB. In other words, the first wall EW arises from the trough base WB and thus forms a trough. The first trough element EWE also has an oil capture opening OAF which is bordered by the first wall EW.

The second trough element ZWE also includes a trough base WB and a second wall ZW connected to the trough base WB. The second wall WB arises from the trough base WB of the second trough element ZWE and thus forms a second trough. The second trough element ZWE, like the first trough element EWE, has an oil capture opening OAF which is bordered by the second wall ZW.

The oil capture opening OAF of the first trough element EWE has a shape and/or size which differs from the oil capture opening OAF of the second trough element ZWE.

It is furthermore clear that on a side facing the second trough element ZWE, the first wall EW has a first inner wall portion EIW. Also, on a side facing the first trough element EWE, the second wall ZW has a second inner wall portion ZIW. The first inner wall portion EIW and the second inner wall portion ZIW run parallel to one another at least in portions. Within this parallel portion, both the first inner wall portion EIW and the second inner wall portion ZIW have a peripherally closed fluidic connection opening FVO. The two fluidic connection openings FVO are oriented aligned with one another. In an embodiment, oil may flow from the first trough element EWE into the second trough element ZWE, or from the second trough element ZWE into the first trough element EWE, via the fluidic connection openings FVO of the first trough element EWE and of the second trough element ZWE. In other words, the first trough element EWE and the second trough element ZWE are fluidically connected together by the fluidic connection openings FVO.

Because of the connection and/or coupling of the first trough element EWE to the second trough element ZWE, the oil distributor OV has a U-shaped outer contour UAK at least in regions, so that the oil distributor OV may surround a gear wheel on its two end faces and on a circumferential portion connecting the two end faces.

Figure 2:
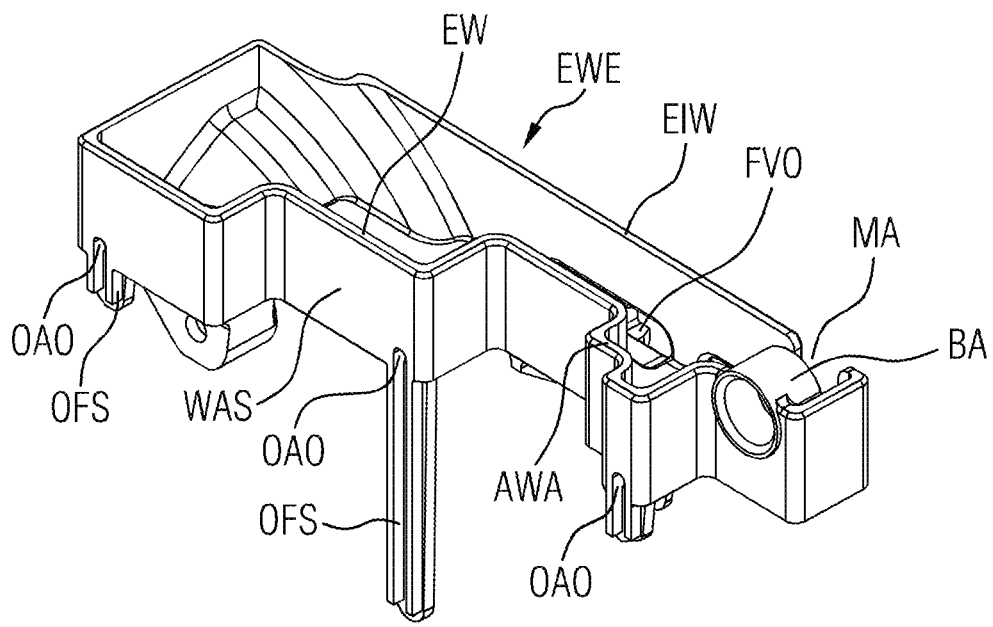
FIG. 2 shows a three-dimensional view of the first trough element.

FIG. 2 shows a three-dimensional view of the first trough element EWE known from FIG. 1. In the first trough element EWE has an outer wall portion AWA formed at a distance from the first inner wall portion EIW and running at least in portions parallel to the first inner wall portion EIW. A fastening receiver BA for stationarily fastening the first trough element EWE in a gear casing (not shown) is formed in the outer wall portion AWA. A material cutout MA is formed in the first inner wall portion EIA, aligned with the fastening receiver BA. The material cutout MA in the first inner wall portion EIA thus allows introduction of a fastener, such as a screw, into the fastening receiver BA. Also, a tool for actuating the fastener may be conducted through the material cutout MA. The material cutout MA may thus also be designated or regarded as a mounting cutout. Thus the first trough element EWE is fastened in a simple and/or compact fashion. The compact fastening is achieved because the fastening receiver BA in the outer wall portion AWA is formed and/or integrated at the level of the first inner wall portion EIW.

The first trough element EWE has at least one oil outlet opening OAO in the trough base WB and/or in the first wall EW, via which the oil may emerge from the first trough element. An oil guide rail OFS is formed, aligned with the oil outlet opening OAO and/or a periphery of the oil outlet opening OAO, on a trough outside WAS of the first trough element EWE. The trough outside WAS faces away from a trough inside for receiving the oil. Via the oil guide rail OFS, which may for example also be described as a drip lug, oil is supplied to specific points, such as bearings, inside a gear mechanism GE.

The oil guide rail OFS has a U-shaped cross-section. A U-shaped oil guide rail OFS is simple and cheap to produce, and allows guidance of the oil.

Figure 3:
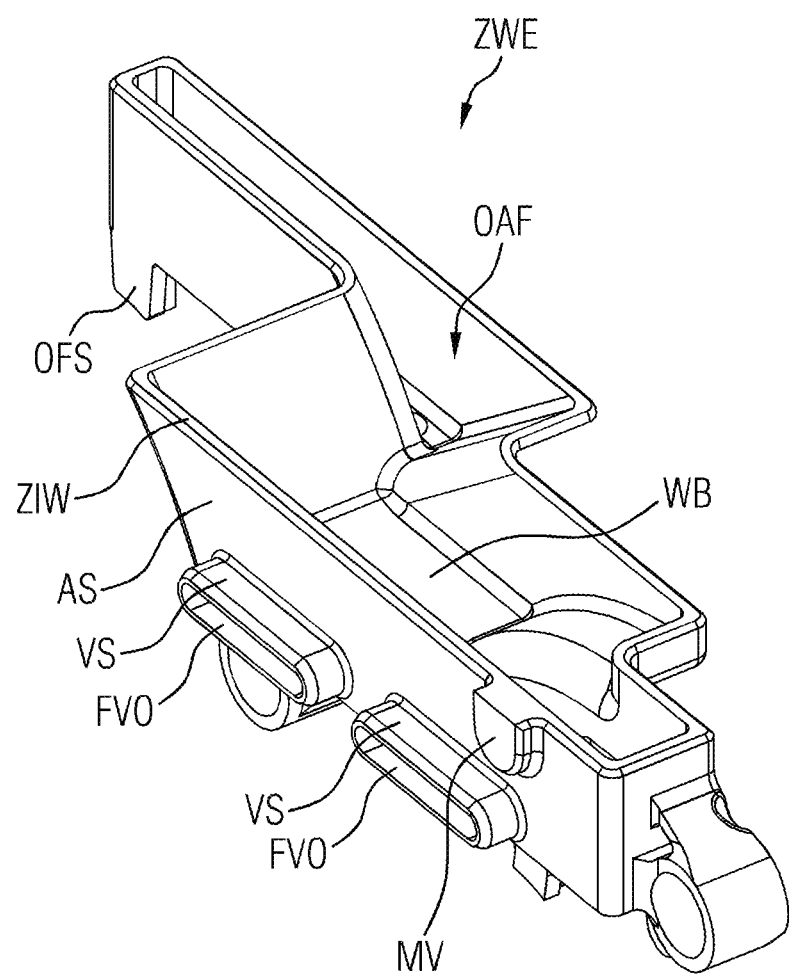
FIG. 3 shows a three-dimensional view of the second trough element.

FIG. 3 shows a three-dimensional view of the second trough element ZWE known from FIG. 1. The fluidic connection opening FVO of the second trough element ZWE has a protrusion VS on an outside AS of the second inner wall portion ZIW. The protrusion VS may also be regarded as a collar which borders the fluidic connection opening FVO on the outside AS of the second trough element ZWE. When the first trough element EWE and the second trough element ZWE are placed on one another as shown in FIG. 1, the protrusion VS or the collar of the second trough element ZWE engages in the fluidic connection opening FVO of the first trough element EWE. In this way, the protrusion VS forms a type of duct and/or bridge between the first trough element EWE and the second trough element ZWE.

It is furthermore clear that on the outside AS of the second inner wall portion ZIW, a material protrusion MV is formed which engages in the material cutout MA when the first trough element EWE is placed onto the second trough element ZWE as shown in FIG. 1. Thus the material cutout MA of the first inner wall portion EIW may be closed, without an additional separate part, by the second trough element ZWE or the material protrusion MV formed on the outside AS of the second inner wall portion ZIW, in order to prevent and/or reduce an escape of oil via the material cutout MA.

Figure 4:
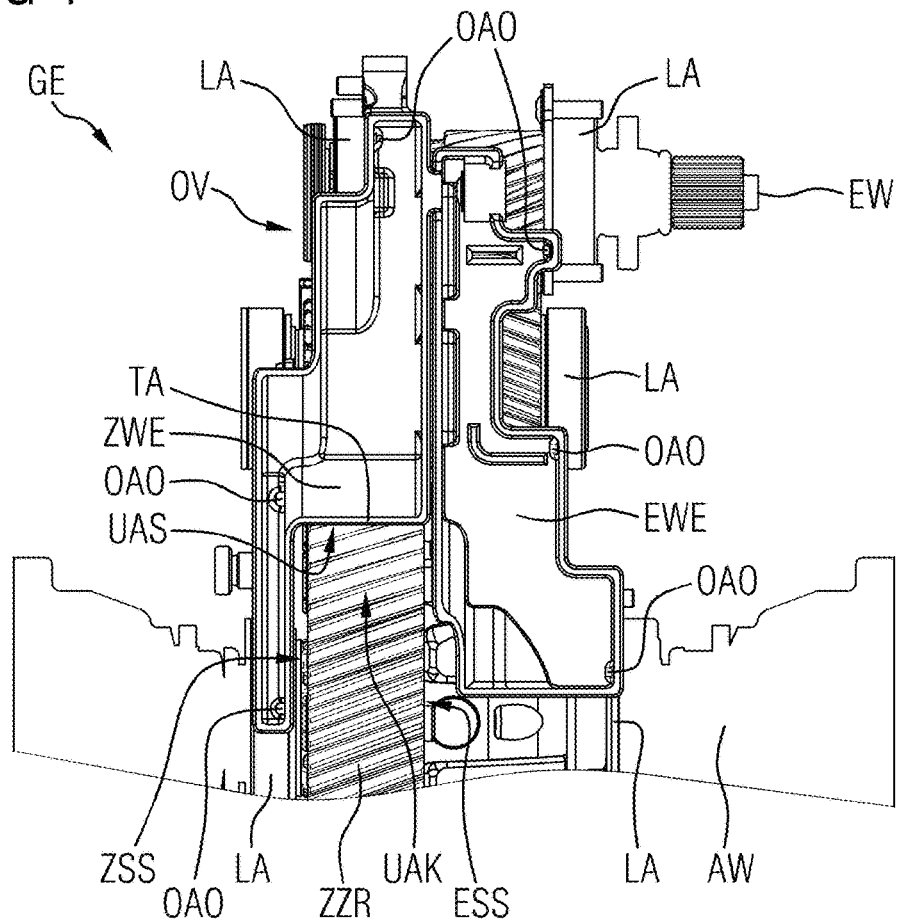
FIG. 4 shows a plan view of a gear mechanism of an axle drive with the oil distributor.

FIG. 4 shows a plan view onto a gear mechanism GE of an axle drive AA. The gear mechanism GE has an input shaft EW with a first gear wheel, an output shaft AW running parallel to the input shaft EW and having a second gear wheel ZZR, and an intermediate shaft ZW arranged between the input shaft EW and the output shaft AW and having a third gear wheel.

The oil distributor OV is arranged such that the U-shaped outer contour UAK of the oil distributor OV partially surrounds the second gear wheel ZZR arranged on the output shaft AW. Accordingly, it is provided that the second gear wheel ZZR is arranged, directly or indirectly, rotationally fixedly on the output shaft AW of the gear mechanism GE. The second gear wheel ZZR has a first end face ESS and a second end face ZSS arranged spaced apart from the first end face ESS in the longitudinal direction of the second gear wheel ZZR. The oil distributor OV is now arranged such that the first trough element EWE is oriented running parallel to the first end face ESS at least in portions. The second trough element ZWE runs parallel to the second end face ZSS at least in portions. A part portion TA of the second trough element ZWE runs parallel to a circumferential portion UAS of the second gear wheel ZZR connecting the first end face ESS and the second end face ZSS. Because of the at least partially U-shaped outer contour UAK of the oil distributor OF, as much oil as possible which has been ejected and/or sprayed out by the second gear wheel ZZR is captured by the oil distributor OV via the oil capture opening OAF.

The input shaft EW, the output shaft AW and the intermediate shaft ZW are each mounted rotatably via two bearings LA. This means that each shaft has two bearings. The respective gear wheel is arranged between the bearings LA of a respective shaft. In other words, the second gear wheel ZZR is arranged between the two bearings LA of the output shaft AW. The third gear wheel is arranged between the two bearings LA of the intermediate shaft ZW, and the first gear wheel is arranged between the two bearings LA of the input shaft EW. The oil outlet openings OAF and/or the oil guide rails OFS are arranged such that oil may be supplied to the above-described bearings LA via the oil distributor OV.

Figure 5:
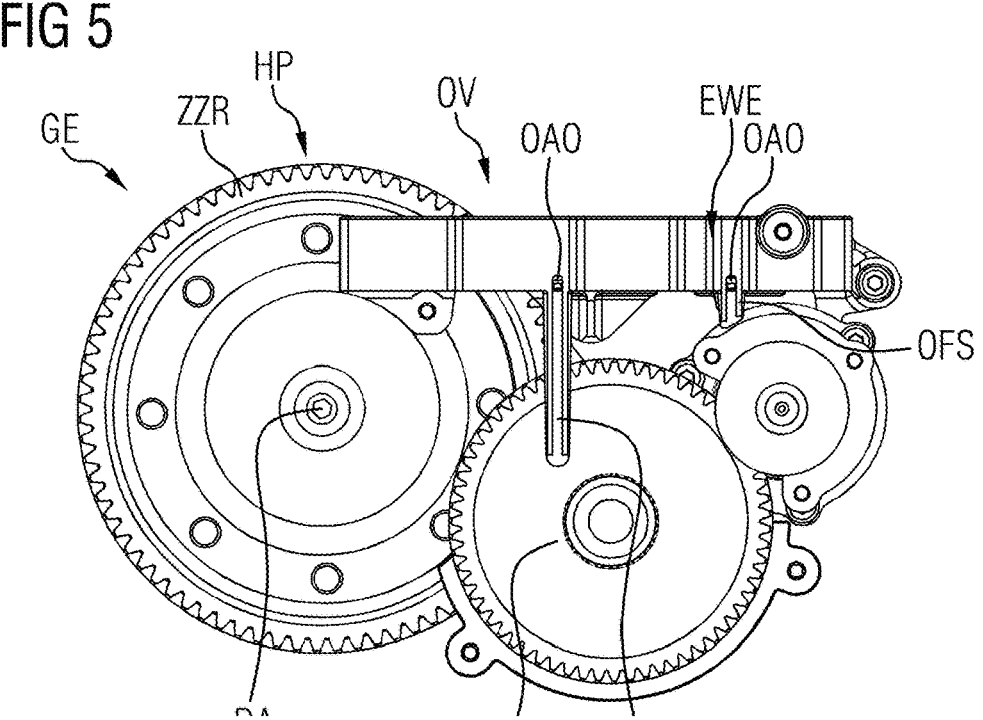
FIG. 5 shows a side view of the gear mechanism with the oil distributor.

FIG. 5 shows a side view of the gear mechanism GE known from FIG. 4, viewed onto the first trough element EWE. A highest point HP of the second gear wheel ZZR protrudes above the oil distributor OV, such as the oil capture opening OAO. During rotation of the second gear wheel ZZR about its rotational axis DA, oil ejected by the second gear wheel ZZR is captured by the oil distributor OV via the oil capture opening OAO. The captured oil is returned to the respective bearing LA of the shafts via the oil outlet openings OAO arranged in the oil distributor OV, and the oil guide rails OFS.

Figure 6:
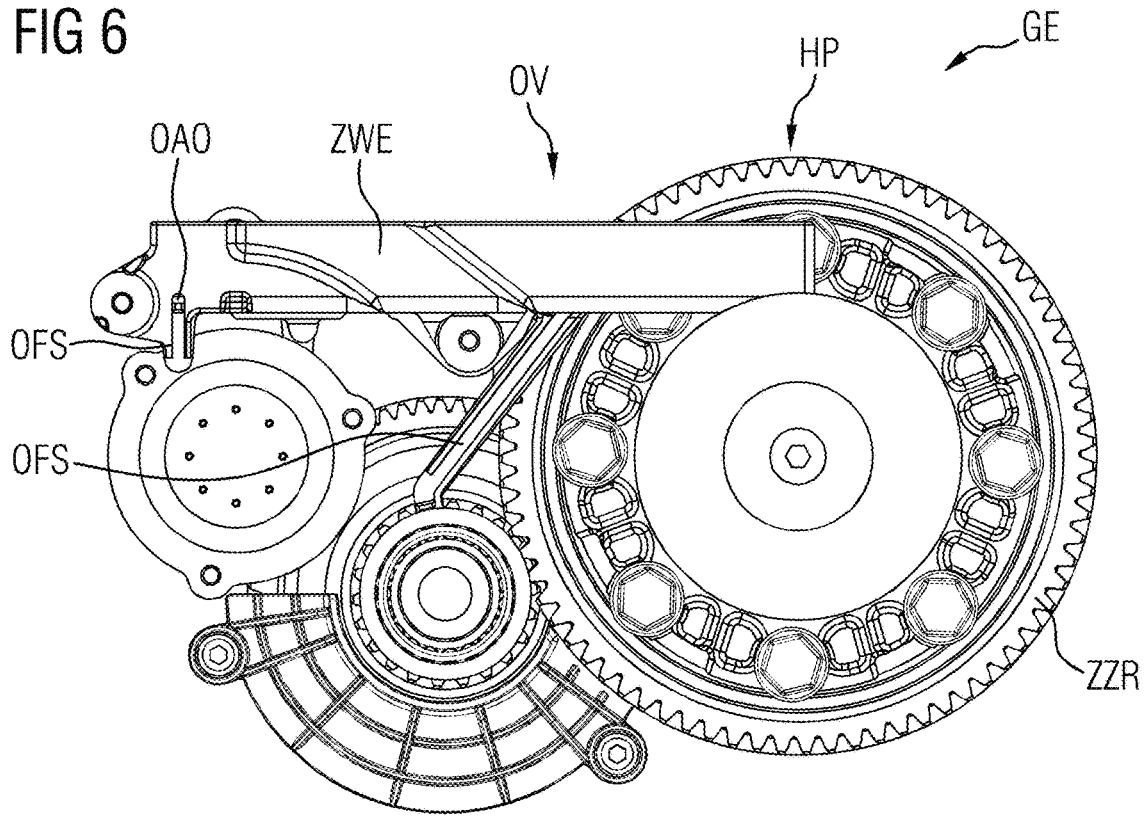
FIG. 6 shows a further side view of the gear mechanism with the oil distributor.

FIG. 6 shows a side view of the gear mechanism GE known from FIG. 4, viewed onto the second trough element ZWE.

Figure 7:
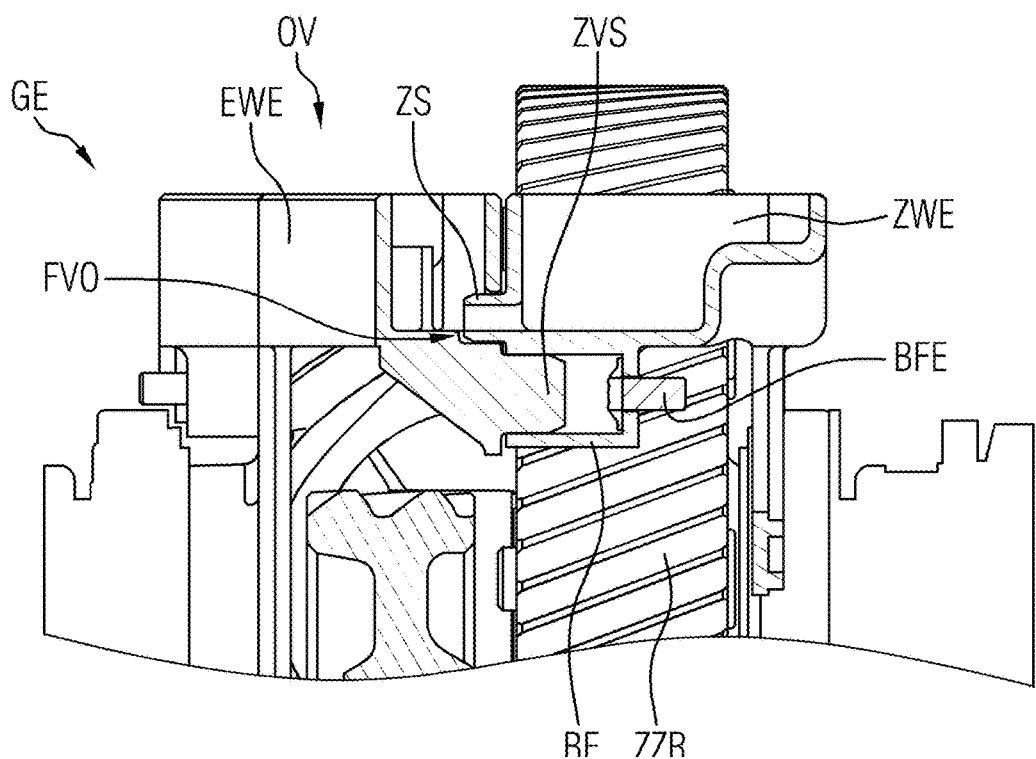
FIG. 7 shows a cross-section through the oil distributor.

FIG. 7 shows a cross-section through the oil distributor OV in the region of the fluidic connection opening FVO. The second trough element ZWE has a fastening device BE, configured as a blind hole, for receiving a fastening element BFE, in order to connect the second trough element ZWE to one half of a gear casing. The first trough element EWE has a centring protrusion ZVS which engages, at least in portions, in the fastening device BE when the first trough element EWE is placed on the second trough element ZWE. in this way, the first trough element EWE and the second trough element ZWE engage in one another with precise fit, so that inter alia, the protrusion VS of the second trough element ZWE engages in the fluidic connection opening FVO of the first trough element EWE.

FIG. 8 shows a motor vehicle KFS with the axle drive AA. The motor vehicle KFZ is an at least partially electrically driven motor vehicle KFZ. The axle drive AA is configured and/or designed to drive the motor vehicle KFZ electrically. The gear mechanism GE, in which the oil distributor OV is arranged, is formed inside the axle drive AA.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An oil distributor for an axle drive of a motor vehicle, the oil distributor comprising:

a first trough element having a first wall;
a second trough element having a second wall, the second trough element placed onto the first trough element;
an oil capture opening being part of the first trough element and/or the second trough element; and
an oil outlet opening formed in the first trough element and/or the second trough element, via which an oil emerges from the oil distributor;
a first inner wall portion being part of the first wall on a side facing the second trough element;
a second inner wall portion being part of the second wall on a side facing the first trough element; and
a plurality of fluidic connection openings, one of the plurality of fluidic connection openings formed in the first inner wall portion, another of the plurality of fluidic connection openings formed in the second inner wall portion, the fluidic connection opening of the first trough element further comprising:
a protrusion on an outside of the first inner wall portion;
wherein, in an assembled state, the first trough element is fluidically connected to the second trough element, the first trough element and the second trough element form a U-shaped outer contour at least in portions such that the first trough element and the second trough element surround portions of a gear wheel of a gear mechanism, and the protrusion engages in the fluidic connection opening of the second trough element.

2. The oil distributor of claim 1, the protrusion further comprising a circumferential collar.

3. The oil distributor of claim 1, the fluidic connection opening of the second trough element further comprising a protrusion on an outside of the second inner wall portion, wherein the protrusion engages in the fluidic connection opening of the first trough element.

4. The oil distributor of claim 3, the protrusion further comprising a circumferential collar.

5. The oil distributor of claim 1, further comprising:
an outer wall portion being part of the first trough element, the outer wall portion spaced apart from the first inner wall portion;
a fastening receiver formed in the outer wall portion for stationary fastening of the first trough element; and
a material cutout formed in the first inner wall portion aligned with the fastening receiver.

6. The oil distributor of claim 5, further comprising:
a material protrusion formed on the outside of the second inner wall portion;
wherein the material protrusion in an assembled state engages in the material cutout.

7. The oil distributor of claim 1, wherein the first trough element and/or the second trough element is made of plastic and/or at least partially comprises plastic.

8. The oil distributor of claim 1, wherein the oil outlet opening is arranged and/or formed in the first wall, in the second wall, and/or in a trough base of the first trough element or a trough base of the second trough element.

9. The oil distributor of claim 1, the oil outlet opening further comprising a plurality of outlet openings spaced apart from one another.

10. The oil distributor of any of claim 1, the oil outlet opening further comprising an oil guide rail on a trough outside of the first trough element and/or the second trough element.

11. The oil distributor of claim 1, the oil guide rail further comprising a U-shaped cross-section.

12. An axle drive of a motor vehicle, comprising:
at least one output shaft of a gear mechanism;
an oil distributor, further comprising:
a first trough element having a first wall;
a second trough element having a second wall, the second trough element placed onto the first trough element;
an oil capture opening being part of the first trough element and/or the second trough element;
at least one oil outlet opening formed in the first trough element and/or the second trough element, via which an oil emerges from the oil distributor, the oil outlet opening further comprising:
at least one oil guide rail on a trough outside of the first trough element and/or the second trough element;
a first inner wall portion being part of the first wall on a side facing the second trough element;
a second inner wall portion being part of the second wall on a side facing the first trough element; and
a plurality of fluidic connection openings, one of the plurality of fluidic connection openings formed in the first inner wall portion, another of the plurality of fluidic connection openings formed in the second inner wall portion, the fluidic connection opening of the first trough element further comprising:
a protrusion on an outside of the first inner wall portion;
wherein, in an assembled state, the first trough element is fluidically connected to the second trough element, the first trough element and the second trough element form a U-shaped outer contour at least in portions such that the first trough element and the second trough element surround portions of a gear wheel of a gear mechanism, and the protrusion engages in the fluidic connection opening of the second trough element;
wherein a gear wheel is arranged rotationally fixedly on the output shaft, and the oil distributor, wherein the oil distributor surrounds the gear wheel at least in portions.

13. The axle drive of claim 12, the gear mechanism further comprising:
a first casing half; and
a second casing half;
wherein the first trough element is fastened in the first casing half and the second trough element is fastened in the second casing half.

14. The axle drive of claim 12, the gear mechanism further comprising:
at least three different shafts spaced apart from one another such that each shaft is mounted rotatably about its respective longitudinal axis by two bearings; and
wherein the at least one oil outlet opening and/or the at least one oil guide rail are arranged and/or oriented such that oil is supplied to each bearing via the at least one oil outlet opening and/or the oil guide rail.

* * * * *